Oct. 18, 1966  A. F. HICKMAN  3,279,820
VEHICLE SPRING SUSPENSION
Filed Jan. 15, 1965  4 Sheets-Sheet 1
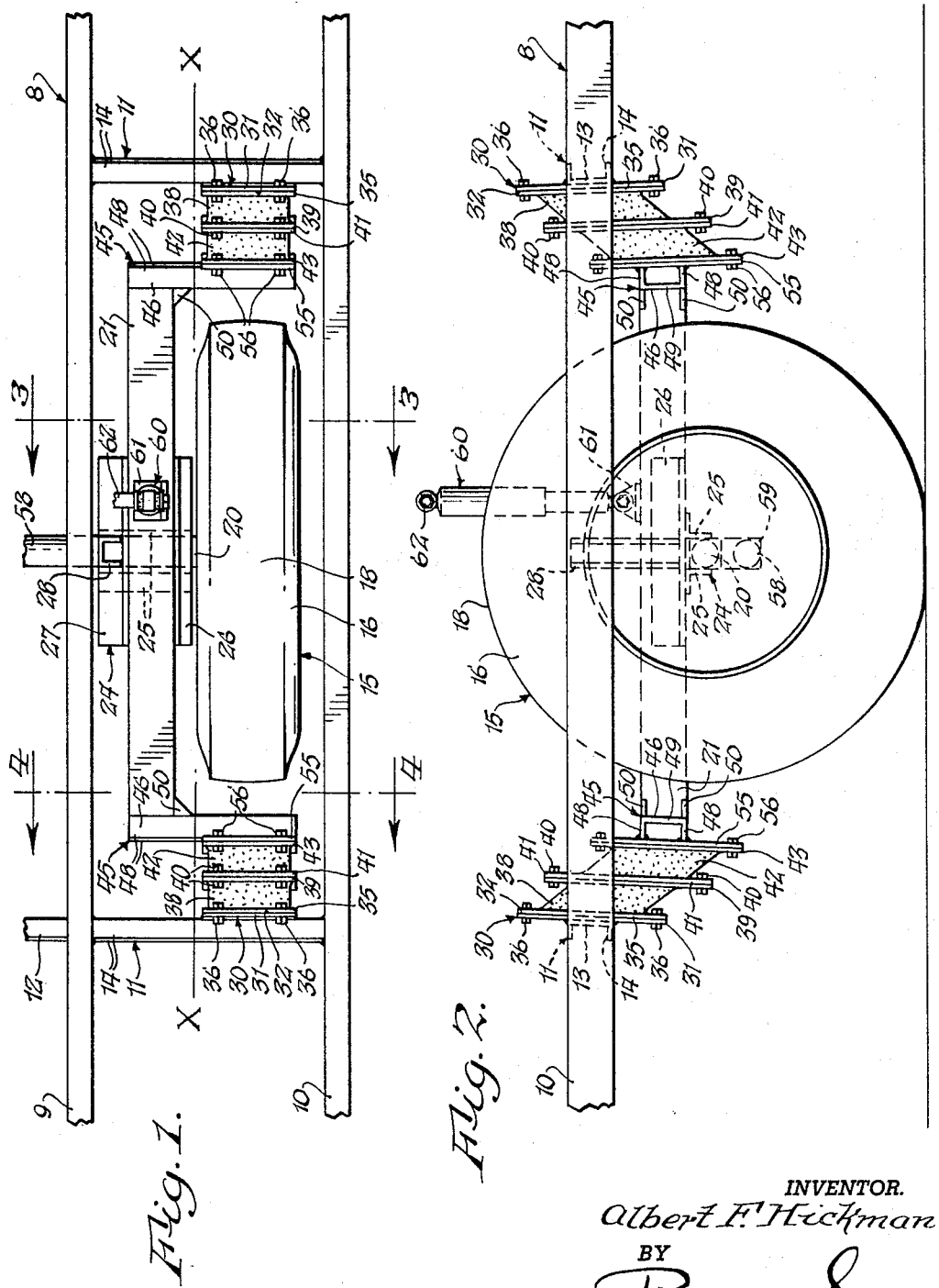
INVENTOR.
Albert F. Hickman
BY
Popp and Sommer
ATTORNEYS.

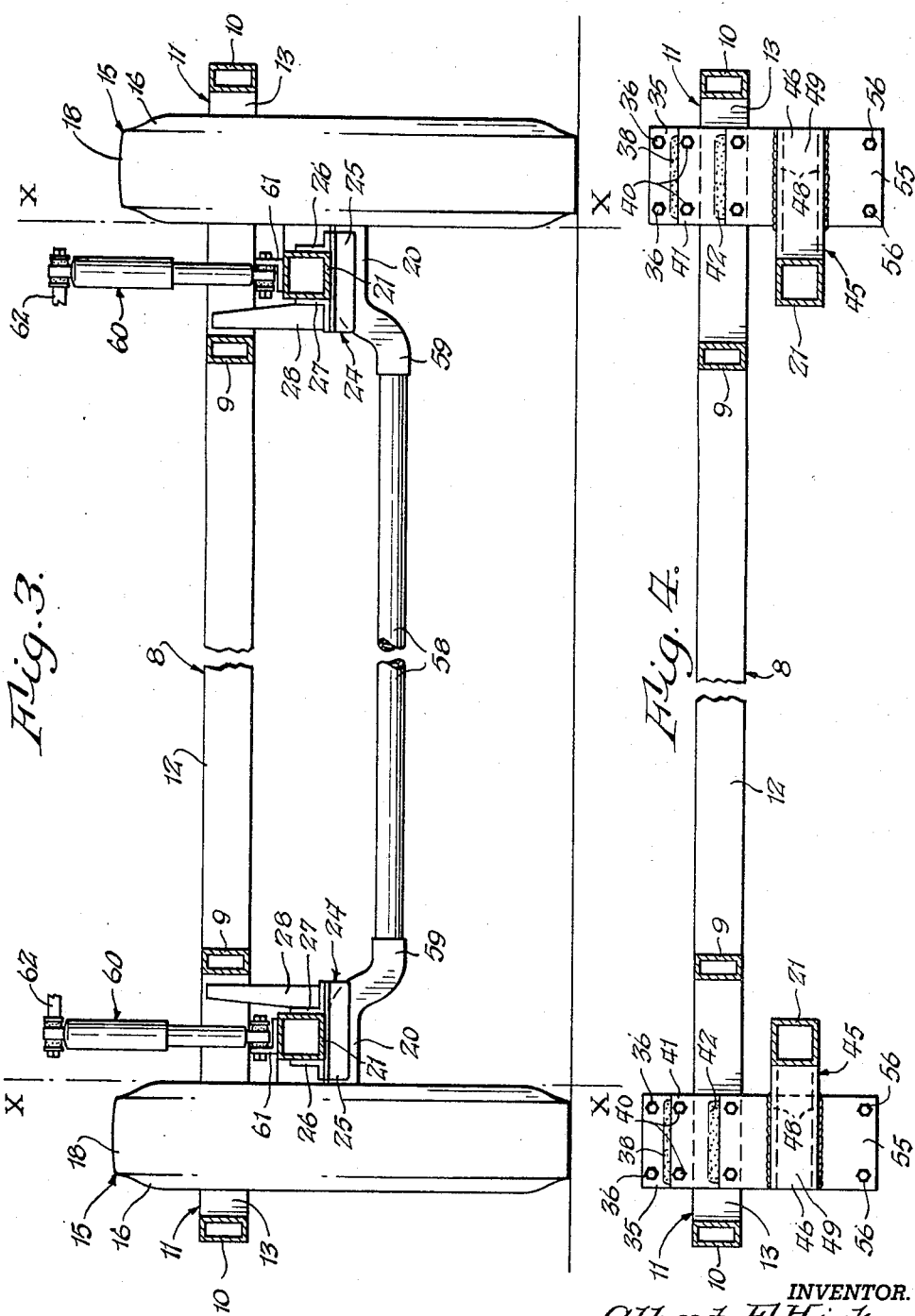

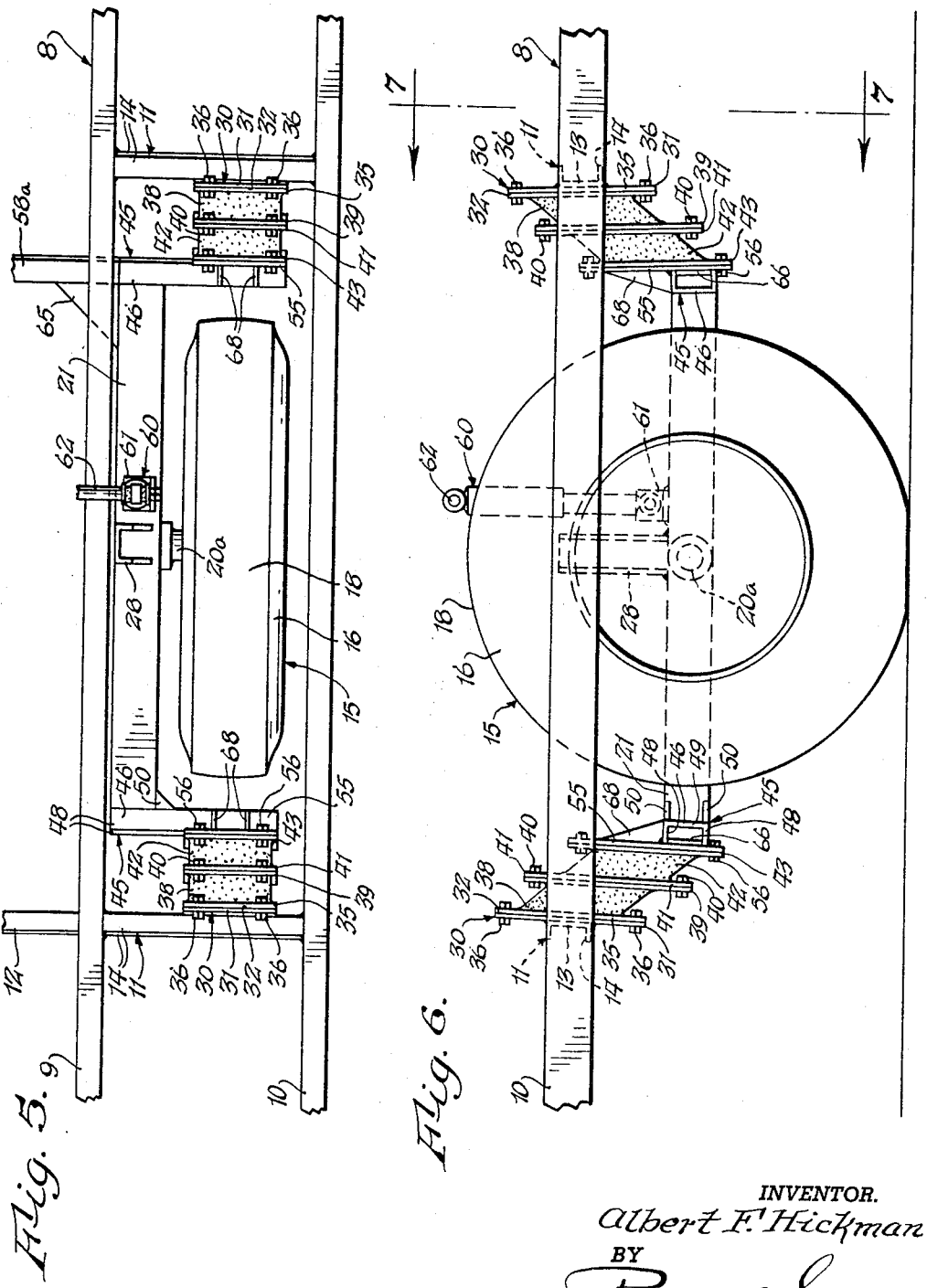

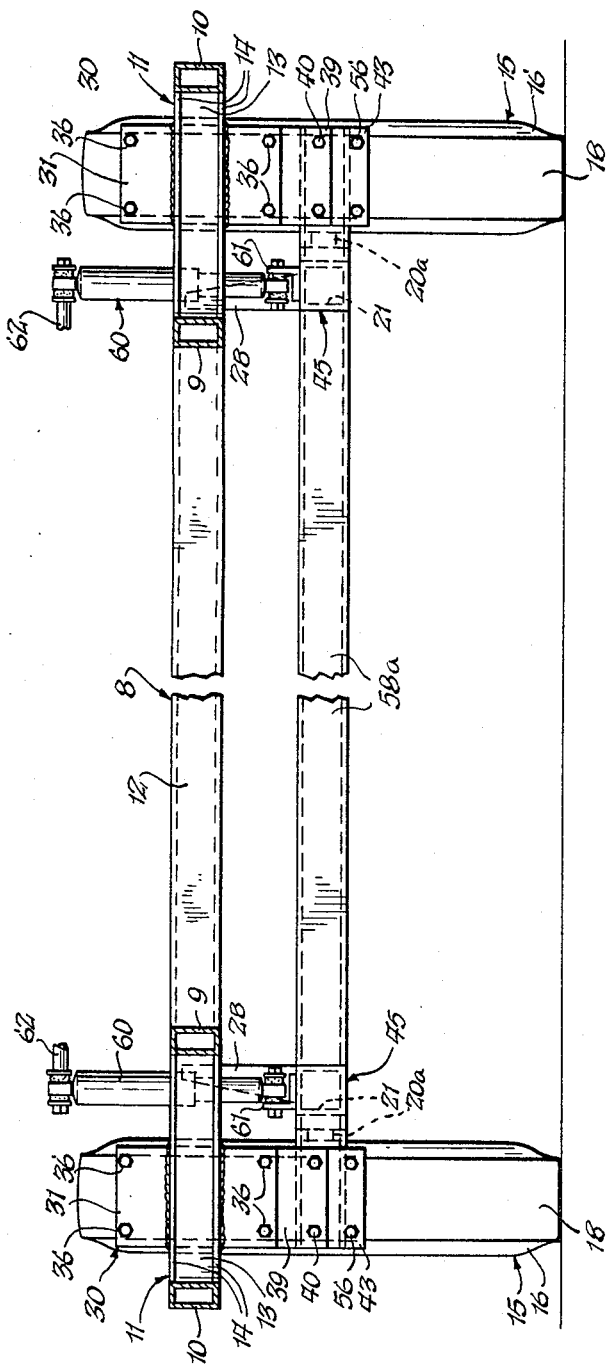

United States Patent Office 3,279,820
Patented Oct. 18, 1966

3,279,820
VEHICLE SPRING SUSPENSION
Albert F. Hickman, Eden, N.Y., assignor to Hickman Development, Inc., Eden, N.Y., a corporation of New York
Filed Jan. 15, 1965, Ser. No. 425,744
4 Claims. (Cl. 280—124)

This invention relates to a vehicle spring suspension of the shear rubber, rectilinear movement type and is more particularly shown in conjunction with the rear or non-steering wheels of such a vehicle.

One of the important objects of the present invention is to provide a shear rubber, rectilinear movement type of spring suspension which is free from friction and will permit the large amount of vertical wheel movement necessary with highway vehicles to provide a vertical ride as soft as load heights will allow and at a low frequency both when the vehicle is empty and under full load.

Another object is to provide such a suspension in which lateral, vertical angular, and a slight amount of longitudinal axle spindle movements, with reference to the vehicle frame, are permitted and resiliently resisted, the lateral and angular resiliency being sufficient to absorb the lateral thrust of the axle, particularly resulting from one wheel moving up and down, thereby to provide increased safety, tire and gasoline mileage and stability, and the longitudinal resiliency being sufficient to eliminate detrimental vibrations due to rigidity of the axle spindles lengthwise of the frame. The elimination of the axle spindle rigidity vertically, longitudinally and angularly with reference to the vehicle frame is requisite for maximum life of the vehicle frame, body suspension, and tires as well as for maximum stability and safety and maximum economies in power and also preservation of the cargo or contents of the vehicle.

Another important object is to provide such a suspension in which the resistance to such lateral or angular axle spindle movement, with reference to the vehicle frame, is automatically controlled by an increasing resistance to motion in proportion to the amplitude and velocity of movement of the axle spindle with reference to the frame.

Another object is the complete elimination of lubrication, other than in the wheel bearings themselves, as well as the lubricant seals and the servicing incidental to parts requiring lubrication.

Another object is to provide such a suspension which will stand up without any servicing, repair or replacement, barring accident, for many years of service even under conditions of severe and constant use.

Another object is to provide such a suspension which is very light in weight, particularly in unsprung weight, as compared with conventional suspensions. An important feature resides in such light weight being in large measure achieved through the use of shear rubber, rectilinear movement springs.

Another object of the invention is to provide such a suspension in which very little shock absorber control is required.

Another object is to provide such a suspension which provides a much wider base by the provision of widely spaced spring centers as compared with conventional leaf springs.

Another object is to provide such a suspension which is low in cost, both as to initial cost and also unkeep, particularly as compared with conventional spring suspensions.

Another object is to provide such a suspension which renders radius rods or auxiliary devices for control of sidesway, such as torsion bar stabilizers, unnecessary, and at the same time can adequately resist all brake and drive torque reactions.

Another object is to provide such a suspension in which periodic vibration of the suspension is dampened out and in which wheel trap is avoided.

Another object is to provide a suspension which has a long and variable spring resistance range both in vertical, lateral and angular axle spindle movements.

Another object is to provide such a suspension employing rubber blocks or bodies in rectilinear shear and in which the bond stress of the rubber is kept within safe working limits.

Other objects and advantages of the invention will be apparent from the following description and drawings in which:

FIG. 1 is a fragmentary top plan view of one side of a vehicle frame supported by a spring suspension embodying the present invention, the opposite side of the vehicle frame and suspension being identical in construction.

FIG. 2 is a fragmentary side elevational view thereof.

FIGS. 3 and 4 are vertical transverse sectional views taken generally on the correspondingly numbered lines of FIG. 1.

FIG. 5 is a view similar to FIG. 1 showing a modified form of the invention.

FIG. 6 is a fragmentary side elevational view of the modified form of the invention shown in FIG. 5.

FIG. 7 is a vertical transverse sectional view taken generally on line 7—7 of FIG. 6.

The main frame 8 of the vehicle can be of any suitable construction and is shown as comprising a pair of inner longitudinal side frame beams 9 and a pair of outer longitudinal side frame beams 10, these longitudinal side beams 9, 10 at each side of the vehicle being shown as connected, fore-and-aft of the wheels, as hereinafter described, by a pair of channel bars 11, and the inner longitudinal side beams 9 being connected by suitable cross beams 12. The channel bars 11 on each side of the vehicle frame are arranged with their webs 13 opposing each other and with their flanges 14 extending away from the wheels. The webs 13 of the cross channel bars 11 at each side of the vehicle frame converge upwardly for a purpose which will presently appear. All of the beams 9, 10 and 12 are shown as being of rectangular, tubular or box form in cross section although any type of beams could, of course, be employed. Also the vehicle frame could include only the cross connected inner longitudinal beams 9, in which event the wheels would be outboard of the frame or it could comprise only the connected outer longitudinal beams 10 in which event wheels would be inboard of the vehicle frame.

Referring more particularly to the form of the invention shown in FIGS. 1–4, the numeral 15 represents a wheel at each side of the vehicle frame, each of these wheels having a rubber tire 16 provided with a tread 18. Each of these wheels is conventionally journalled on a generally horizontal axle spindle 20 extending transverse of the line of movement of the vehicle frame 8 and these axle spindles are in coaxial relation to each other.

A horizontal torsionally rigid beam 21 is supported at its central part on each axle spindle 20 and extends lengthwise of the line of movement of the vehicle frame to points adjacent the tread 18 of the corresponding tire 16. To provide its torsional rigidity each beam 21 is preferably made of tubular, rectangular or box form in cross section as best shown in FIG. 3, and an important feature of the invention resides in each of these beams having sufficient torsional and vertical bending strength to transmit all vertical forces from the vehicle frame 8 directly to the axle spindles 20. The connection between each torsionally rigid beam 21 and its spindle 20 can be of any suitable form, each axle spindle 20 being shown as having for this purpose an axle bracket 24 having angle iron lower parts 25 welded or otherwise secured to the axle spindle 20 and angle iron upper parts 26 and 27 welded or otherwise suitably secured to opposite vertical sides of the companion torsionally rigid beam 21. To limit lateral movement of the wheels 15 with reference to the vehicle frame 10, upstanding stops 28 of channel form in cross section are shown as having their bases welded to the inner angle bars 27 of each axle bracket 24 and projecting upwardly alongside the outer faces of the inner pair of longitudinal side frame beams 9 to limit movement of the wheels 15 laterally of the frame 8 in both directions.

The numeral 30 represents a frame bracket fixed to the vehicle frame 8 adjacent each end of each torsionally rigid beam 21. This frame bracket is shown as being in the form of an upright rectangular plate 31 extending transversely of the line of movement of the vehicle frame 8 and each is shown as welded to the web 13 of a corresponding cross bar 11 which faces the companion wheel 15 to provide an upright face 32 opposing the tread 18 of the tire and also opposing the frame bracket 30 at the same side of the vehicle frame 10. These frame bracket plates 31 at each side of the vehicle frame 10 converge upwardly for a purpose which will presently appear.

A feature of the invention resides in the resilient support of the vehicle frame 8 being provided by a plurality of rectilinear movement, shear rubber bodies which provide the required resilient resistance to movement of the body relative to the wheels 15. To this end an outer rectangular metal plate 35 has one face arranged against the face 32 of each frame bracket plate 31 and is secured thereto by four corner bolts 36. To the opposite face of each of these brackets 35 is vulcanized a block or a body 38 of resilient rubber. The opposite sides of these bodies 38 or rubber have vulcanized thereto a rectangular intermediate plate 39. Each of these rectangular intermediate plates 39 is secured, as by four corner bolts 40 to a similar rectangular metal plate 41. To the face of each of these intermediate plates 41 which faces its wheel 15 is vulcanized a block or body 42 of rubber the opposite generally vertical face of this rubber body having vulcanized thereto an inner rectangular metal plate 43. The rectangular inner metal plates 43 are parallel with their companion intermediate plates 39 and 41 and with the companion outer rectangular metal plates 35 and since the webs 13 of the companion pair of frame brackets 11 at each side of the vehicle frame converge upwardly, it will be seen that the inner plates 43 at each side of the vehicle frame converge upwardly with reference to each other.

An important feature of the invention resides in the provision of a cantilever bracket 45 fixed to and projecting horizontally laterally outwardly from each end of each torsionally rigid beam 21 into the space between the corresponding axle bracket 30 and tread 18 of the tire 16 and secured at its outboard or other end to the inner plate 43 of the corresponding pair of rubber spring bodies 38 and 42. To this end each cantilever bracket is shown as being in the form of a horizontal bar 46 of channel form in cross section with its flanges 48 facing away from its wheel 15 and one end of its web 49 secured, as by welding, to the adjacent end of the companion torsionally rigid beam 21 and preferably provided with one or more triangular gusset plates 50 to reinforce this connection. Each channel bar 46 is preferably welded to its torsionally rigid beam 21 in a tipped position so that its web 49 is parallel to the web 13 of the companion cross frame bar 11 and hence so that the webs 49 of the cantilever brackets 45 at each side of the vehicle frame converge upwardly with reference to each other.

At its outboard end each cantilever bracket 45 has welded to its flanges a rectangular plate 55, each of these plates being in face-to-face relation with the inner rectangular plate 43 of the corresponding array of spring bodies 38, 42 and secured thereto by corner bolts 56 or in any suitable manner.

In the form of the invention shown in FIGS. 1–4, the two torsionally rigid beams 21 are cross connected by a cross member 58. The function of this cross member 58 is to serve substantially only to support the wheels 15 against horizontal lateral forces and thereby hold them in alinement, and hence a feature of the invention that it is proportioned to its limited service in resisting such horizontal lateral forces. To this end, the cross member 58 is shown as being in the form of a cylindrical tube of much smaller diameter than the tubular torsionally rigid beams 21 and the ends of this cross tube 58 is shown as fixed in downwardly and inwardly opposing projections 59 of the axle spindles 20. While the parts 20, 58, 59 have the appearance of being a drop center axle, the tubular cross member 58 does not function as an axle, and is not provided with the bending strength which would be required for such functioning as an axle, it merely serving to rigidly support the two torsionally rigid beams 21 with sufficient bending strength for its limited service in resisting horizontal lateral forces against the wheels 50 such as would otherwise cause them to tip sideways.

For optimum ride, a shock absorber 60 can be provided at each side of the vehicle frame, these being shown as being of the telescopic type, each having its lower end attached to an upstanding ear 61, this ear being secured, as by welding, to each torsionally rigid bar 21 near its center. The upper end of each shock absorber can be suitably attached to the vehicle frame (not shown), as through a horizontal stud bolt 62. These shock absorbers can also act as stops to limit the upward movement of the wheels 15 with reference to the vehicle frame 8.

In the operation of the suspension, upward movement of either wheel 15, through its axle spindle 20, effects a corresponding upward movement of the center part of the torsionally rigid beam 21 fixed to this axis spindle. This effects a corresponding movement of the cantilever brackets 45 at the opposite ends of each torsionally rigid beam 21. This movement is yieldingly resisted by the two arrays of rectilinear movement shear rubber bodies 38 and 42 connected with the cantilever brackets 45 at one end and connected with the channel-shaped cross bars 11 of the vehicle frame 8 at their opposite ends. The two groups of plates 31, 35, 39, 41, 43 and 55 for these rubber bodies 38, 42 at each side of the vehicle converge upwardly with reference to each other so that the rubber bodies 38, 42 offer progressively increasing resistance to upward movement of the wheel 15 and so that there are no forces created tending to tear the bond between any of the rubber bodies 38, 42 and the plates to which they are vulcanized.

An important feature of the invention is that the rubber bodies 38, 42 are at least in part outside of the vertical plane, designated at X—X, FIGS. 1 and 3, of the inner circular face of the companion tire 16. Desirably, with the single wheels shown these rubber bodies are directly in line and centered with the tread 18 of their tire, but with dual wheels such would not necessarily be necessary. By virtue of this location, these rubber bodies 38 and 42 in part or in whole aline with the tread of their companion tire 16, and by making the torsionally rigid beam 21 with sufficient torsional and vertical bending strength, the entire vertical static and dynamic force from the vehicle body 8 to the axle spindles 20, and vice versa, can be transmitted directly from the torsionally rigid beams 21 to the axle spindles 20.

The only other force to be counteracted is the horizontal lateral force against either wheel 15 which would tend to tip the same sideways such force arising from centrifugal force against the body as in rounding a curve in the road, for example. Such relatively minor or small forces are resisted by the bending strength of the small cross member or tube 58 which can be of the small tubular cross section shown as compared with the torsionally rigid beams 21. This torsional rigidity of these torsional rigid beams 21 is required by the cantilever relation of the brackets 45 at the opposite ends of each of these torsionally rigid beams 21 and which cantilever relation is necessary to permit each torsionally rigid beam 21 to be inside of its wheel 15 and the rubber bodies 38, 42 to be in line with the tread 18 of the tire of the companion wheel 15. The longer the effective lever arm length of the cantilever brackets 45 the greater the torsional resistive strength required in the torsionally rigid beam 21.

The shock absorbers 60 are desirable to limit the rebound movement of the wheels 15 and can also act as bottoming stops for the suspension.

It will also be noted that the rubber bodies 38 and 42 not only provide resilient resistance and support for vertical movement of the vehicle frame 8 with reference to the wheels 15 but also permit lateral movement of these wheels with reference to the vehicle frame to the extent permitted by the upstanding stops 28 at opposite sides of the suspension. Since these bodies permit both vertical and lateral horizontal movement of the axle spindles 20 they also permit angular movement of these axle spindles such as to permit one wheel 15 to rise with reference to the other wheel when going over a bump in the road.

These rubber bodies also permit a limited movement of the axle spindles 20 longitudinally of the frame 8. While these are essentially rectilinear movement shear springs acting at right angles to such axle spindle movement, the optimum axle spindle movement lengthwise of the frame is very small, in the order of a small fraction of an inch, and these bodies compress to provide such small movement. Such resiliently permitted movement is highly desirable against sledge hammer blows of the axle spindles and wheels lengthwise of the frame.

Since the rubber bodies 38 and 42 at each side of the vehicle are interposed between the upwardly converging plates 31, 35, 39, 41, 43 and 55 at opposite sides of the corresponding wheel, it will be seen that the downward movement of the frame brackets 30 effects a wedge action on these rubber bodies. This wedging action increases as the load increases. This wedging action greatly increases the load capacity of the rubber bodies vulcanized to the rectangular metal plates and through which the rubber bodies are secured to the frame brackets 30 and to the cantilever brackets 45. This wedging action also eliminates the cost of an adjusting mechanism for the initial stress imposed upon the rubber bodies and simplifies the mounting problems by the elimination of such adjustment. It also improves the resistance curve of the rubber springs since the resistance is more nearly constant at the start of the deflection and increases, through compression of the rubber bodies, as the deflection increases.

Except for the wheel bearings themselves, lubrication requirements are entirely eliminated in the suspension and it will stand up under conditions of severe and constant use, regardless of atmospheric or climatic, road or type of load conditions, at least five years without service. Salt, road dust and weather conditions will not substantially affect the action of the suspension. Oil will slightly affect the rubber bodies if made of natural rubber but only the extreme outer portions thereof and will not go deep enough to cause any substantial damage within a five year period.

In addition to the vertical forces being carried directly from the rubber bodies 38, 42 via the cantilever brackets 45 and torsionally rigid beams 21 directly to the axle spindles 20 the spring suspension of the present invention provides a stable support for the vehicle frame 8, particularly as against sidesway with vehicle bodies (not shown) having a high center of gravity. This stability is achieved by having the rubber bodies 38, 42 arranged at a high elevation and also widely spaced from the center of the vehicle frame 8. Thus it will be noted, in reference to FIG. 1, that the centers of these rubber bodies are in line with the centers of the treads 18 of the wheel tires, and since sideway control is in proportion to the square of the distance between the rubber bodies 38, 42 at opposite sides of the vehicle, it will be seen that they are highly effective in achieving lateral stability of the vehicle, particularly so far as sidesway is concerned. For example, with 50" spring centers the square of the distance bteween the spring would be 2500, whereas the square of 70" spring centers is 4900, this being almost a 100% improvement in sidesway control achieved by placing the spring centers 10" further out on each side of the vehicle.

The modified form of the invention shown in FIGS. 5–7 is substantially identical to that shown in FIGS. 1–4 except that the cross member 58a connecting the two torsionally rigid beams 21 are shown as being in the form of a bar rigidly connecting one pair of end extremities of the torsionally rigid beams 21 instead of being in the form of a tube at the center of these beams resembling a drop center axle as in the form of the invention shown in FIGS. 1–4. The cross member 58a can form a continuation of the corresponding pair of cantilever brackets 45 and preferably is reinforced at each end by a gusset 65 between it and each torsionally rigid beam 21. In addition, it is desirable that the cross member 58a also be of tubular form in cross section and since as a continuation of one pair of the channel-shaped cantilever brackets 45 it would otherwise be channel-shaped in cross section, it is desirable that the cross member 58a have a plate 66 welded to the edge of its flanges which form continuations of the flanges 48 so as to convert the cross member 58a into a tube.

With the form of the invention shown in FIGS. 5–7 the axle spindle 20a can be welded to protrude directly outwardly from the center of its torsionally rigid bar 21, there being no necessity for the offset 59 to accommodate the cross tube 58. With such lowering of the elevation of the torsionally rigid tubes 45, additional gussets, such as 68, may be necessary.

It will be seen that the modification shown in FIGS. 5–7 illustrates that the cross member 58 or 58a connecting the two torsionally rigid beams 21 not only can be of very light construction for their very limited service but can also be located anywhere along the torsionally rigid beams 21 such as at the center as shown in FIGS. 1–4 or at the ends as shown in FIGS. 5–7.

From the foregoing it will be seen that the present invention provides a very stable and simple suspension which is strong and durable in construction and is not likely to get out of adjustment or require repair and which at the same time is light in weight and low in cost, particularly in eliminating the necessity for heavy cross members connecting the two torsionally rigid beams 21, this being achieved by transmitting substantially all vertical forces through these beams directly to the axle spindles, thereby to relieve the members connecting these beams from all service other than that of resisting horizontal lateral forces against the wheels which would cause them to tip.

By "rubber" as used in the accompanying claims is meant both natural rubber and also synthetic rubber and mixtures of natural and synthetic rubbers.

I claim:

1. A vehicle spring suspension adapted to be interposed between a vehicle frame and a wheel having a rubber tire for supporting each side of said vehicle frame and journalled on a generally horizontal axle spindle extending transversely of the line of movement of said vehicle frame, comprising a metal beam which is torsionally rigid about its longitudinal axis and is supported at its central part on each axle spindle and extends lengthwise of said line of movement of said vehicle frame to opposite points adjacent the tread of the corresponding tire, a frame bracket adapted to be fixed to said vehicle frame adjacent each end of each of said torsionally rigid beams and having an upright face opposing the tread of the corresponding tire and opposing the frame bracket at the same side of the vehicle frame, a cantilever bracket fixed to and projecting horizontally laterally outwardly from each end of each torsionally rigid beam into the space between the corresponding frame bracket and tire tread and having an upright face opposing the upright face of the companion frame bracket, a rectilinear movement shear rubber body fixed to and interposed between each companion pair of said upright faces, and a cross member rigidly connecting said torsionally rigid bars together, each of said rubber bodies being arranged at least in part outside of the vertical plane defined by the circular inner face of the corresponding tire whereby substantially all vertical dynamic and static forces from the vehicle body are transmitted from said rubber bodies substantially exclusively directly from said cantilever brackets through said torsionally rigid beams to said axle spindles and wheels, and said cross member serves to keep said wheels in alinement by resisting substantially only horizontal lateral forces against said wheels, said torsionally rigid beams having sufficient longitudinal torsional and vertical bending strength to transmit all of said vertical dynamic and static forces from the vehicle frame directly to said axle spindles and wheels, and the vertical bending strength of said cross member being proportioned to its lighter service in resisting only such horizontal lateral forces against said wheels.

2. A vehicle spring suspension as set forth in claim 1 wherein said torsionally rigid beam is of tubular form in cross section.

3. A vehicle spring suspension as set forth in claim 1 additionally including means directly connecting said cross member to said axle spindles and forming the sole rigid connection between said torsionally rigid beams.

4. A vehicle suspension as set forth in claim 1 additionally including a shock absorber connected to each of said torsionally rigid beams adjacent the center thereof.

References Cited by the Examiner

UNITED STATES PATENTS

| | | | |
|---|---|---|---|
| 2,758,832 | 8/1956 | Hickman | 267—63 |
| 2,782,026 | 2/1957 | Hirst | 267—63 X |
| 2,798,735 | 7/1957 | Compton | 267—63 X |
| 3,050,300 | 8/1962 | Hickman | 267—63 |

BENJAMIN HERSH, *Primary Examiner.*

M. S. SALES, *Assistant Examiner.*